(12) United States Patent
Rambo

(10) Patent No.: US 11,674,438 B1
(45) Date of Patent: Jun. 13, 2023

(54) THERMAL MANAGEMENT SYSTEM

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/958,617

(22) Filed: Oct. 3, 2022

(51) Int. Cl.
*F02C 6/08* (2006.01)
*B64D 15/04* (2006.01)

(52) U.S. Cl.
CPC ............. *F02C 6/08* (2013.01); *B64D 15/04* (2013.01); *F05D 2220/323* (2013.01); *F05D 2260/601* (2013.01); *F05D 2260/606* (2013.01)

(58) Field of Classification Search
CPC ......... B64D 15/08; B64D 15/04; F02C 7/185; F02C 7/045; F02C 9/18; F02C 6/08; F05D 2220/323; F05D 2260/601; F05D 2260/606
See application file for complete search history.

(56) References Cited

U.S. PATENT DOCUMENTS

| | | | | |
|---|---|---|---|---|
| 11,434,824 | B2 * | 9/2022 | Rambo | F02C 7/16 |
| 11,518,525 | B2 * | 12/2022 | Suciu | H02K 7/1823 |
| 2014/0250898 | A1 * | 9/2014 | Mackin | F02C 7/047 60/785 |
| 2021/0284351 | A1 * | 9/2021 | Chilukuri | B64D 33/02 |
| 2021/0348564 | A1 * | 11/2021 | Mackin | B64D 33/02 |
| 2022/0145796 | A1 * | 5/2022 | Hallisey | F02C 7/143 |
| 2022/0252011 | A1 * | 8/2022 | Rambo | F02C 6/08 |

* cited by examiner

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A method for thermal management for an aircraft includes extracting a flow of compressed fluid from a compressor section of a propulsion system. The flow of compressed fluid is passed through an anti-ice system. The flow of compressed fluid flows from the anti-ice system to a turbine. The flow of compressed fluid is expanded across the turbine. The expanded flow of compressed fluid then flows to thermal communication with a thermal load.

20 Claims, 7 Drawing Sheets

THERMAL MANAGEMENT SYSTEM

FIELD

The present disclosure relates to thermal energy management for propulsion systems and vehicles.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Typically, gas turbine engines incorporate the use of one or more thermal management systems to control thermal energy of various fluids passing through the various components of the engine. The thermally managed fluids can then be utilized by the engine or by other portions of the aircraft, such as an environmental control system, an auxiliary power unit, or an air cycle machine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
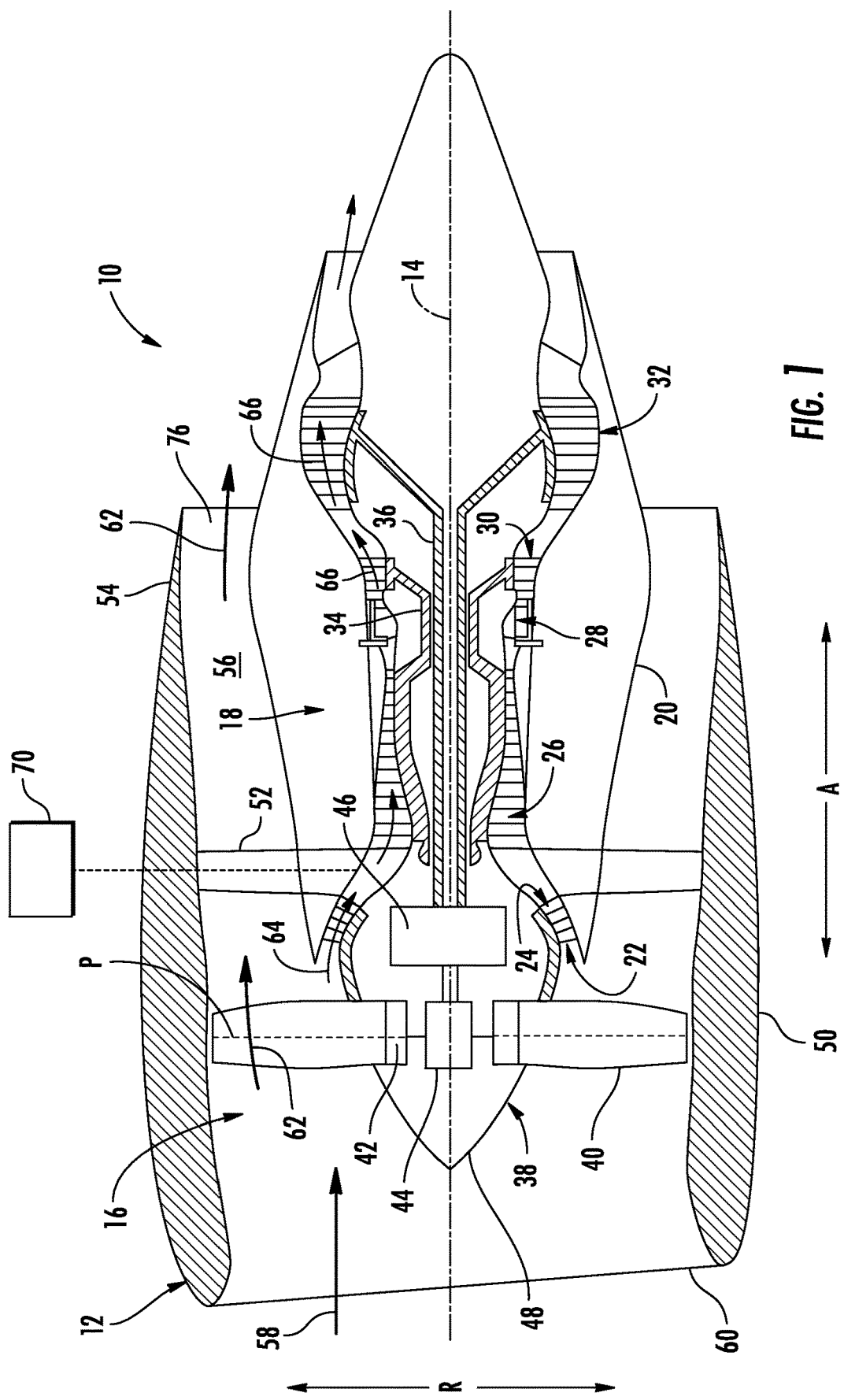
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "first" and "second" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "at least one of" in the context of, e.g., "at least one of A, B, and C" refers to only A, only B, only C, or any combination of A, B, and C.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The present disclosure is generally related to thermal management systems for propulsion systems of a vehicle, such as an aircraft. In some embodiments, the disclosed thermal management systems take bleed air from a compressor section of the propulsion system and use an anti-ice system of the vehicle as a pre-cooler of the bleed air. The bleed air flows through the anti-ice system and is then routed to an expansion turbine. The bleed air from the anti-ice system is expanded by the expansion turbine to generate rotational energy that is transferred from the expansion turbine to power a load device. Additionally, the expanded bleed air flows downstream from the expansion turbine to a thermal load to provide thermal energy transfer for one or more devices or systems of the vehicle.

In some embodiments, the thermal management system of the present disclosure uses bleed air extracted, for example, from a pressurized section of the propulsion system (e.g., a compressor section or other pressurized section of the propulsion system) having a temperature suitable to provide thermal energy transfer to a heating-demand device of the vehicle (e.g., an anti-ice system) before expanding the bleed air for engine cooling uses. Such a configuration may have a dual benefit to various aerodynamic surfaces (e.g., providing anti-icing of such surfaces), while also reducing a temperature of an airflow to be used for cooling purposes.

Referring now to the drawings, wherein identical numerals indicate the same elements throughout the figures, FIG. 1 is a schematic, cross-sectional view of a propulsion system 10 in accordance with an exemplary embodiment of the present disclosure. More particularly, for the embodiment of FIG. 1, propulsion system 10 includes a gas turbine engine, referred to herein as "turbofan engine 12." In one example, turbofan engine 12 can be a high-bypass turbofan jet engine. As shown in FIG. 1, turbofan engine 12 defines an axial direction A (extending parallel to longitudinal centerline 14 provided for reference) and a radial direction R. In general, turbofan engine 12 includes a fan section 16 and a core turbine engine 18 disposed downstream from fan section 16.

The exemplary core turbine engine 18 depicted generally includes a substantially tubular outer casing 20 that defines an annular inlet 22. Outer casing 20 encases, in serial flow order/relationship, a compressor section including a booster or low pressure compressor 24 ("LP compressor 24") and a high pressure compressor 26 ("HP compressor 26"); a combustion section 28; a turbine section including a high pressure turbine 30 (HP turbine 30") and a low pressure turbine 32 ("LP turbine 32"). A high pressure shaft or spool 34 ("HP spool 34") drivingly connects HP turbine 30 to HP compressor 26. A low pressure shaft or spool 36 ("LP spool 36") drivingly connects LP turbine 32 to LP compressor 24.

For the embodiment depicted, fan section 16 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable actuation member 44 configured to collectively vary the pitch of fan blades 40, e.g., in unison. Fan blades 40, disk 42, and actuation member 44 are together rotatable about longitudinal centerline 14 by LP spool 36 across a power gear box 46. Power gear box 46 includes a plurality of gears for stepping down the rotational speed of LP spool 36 to a more efficient rotational fan speed.

Referring still to the exemplary embodiment of FIG. 1, disk 42 is covered by a rotatable front hub 48 aerodynamically contoured to promote an airflow through the plurality of fan blades 40. Additionally, fan section 16 includes an annular fan casing or outer nacelle 50 that circumferentially surrounds variable pitch fan 38 and/or at least a portion of core turbine engine 18. It should be appreciated that in some embodiments, nacelle 50 can be configured to be supported relative to core turbine engine 18 by a plurality of circumferentially spaced outlet guide vanes 52. Moreover, a downstream section 54 of nacelle 50 can extend over an outer portion of core turbine engine 18 so as to define a bypass airflow passage 56 therebetween.

During operation of turbofan engine 12, a volume of air 58 enters turbofan engine 12 through an associated inlet 60 of nacelle 50 and/or fan section 16. As the volume of air 58 passes across fan blades 40, a first portion of air 58 as indicated by arrows 62 is directed or routed into bypass airflow passage 56 and a second portion of air 58 as indicated by arrow 64 is directed or routed into LP compressor 24. The ratio between first portion of air 62 and second portion of air 64 is commonly known as a bypass ratio. The pressure of second portion of air 64 is then increased as it is routed through high pressure (HP) compressor 26 and into combustion section 28, where it is mixed with fuel and burned to provide combustion gases 66. Subsequently, combustion gases 66 are routed through HP turbine 30 and LP turbine 32, where a portion of thermal and/or kinetic energy from combustion gases 66 is extracted.

Combustion gases 66 are then routed through combustion section 28 of core turbine engine 18 to provide propulsive thrust. Simultaneously, the pressure of first portion of air 62 is substantially increased as first portion of air 62 is routed through bypass airflow passage 56 before it is exhausted from a fan nozzle exhaust section 68 of turbofan engine 12, also providing propulsive thrust.

Moreover, as is depicted schematically, turbofan engine 12 further includes various accessory systems to aid in the operation of turbofan engine 12 and/or an aircraft including turbofan engine 12. For example, turbofan engine 12 may further include a lubrication system configured to provide a lubricant to, e.g., various bearings and gear meshes in the compressor section (including LP compressor 24 and HP compressor 26), the turbine section (including HP turbine 30 and LP turbine 32), HP spool 34, LP spool 36, and power gear box 46. The lubricant provided by the lubrication system increases the useful life of such components and removes a certain amount of heat from such components.

As is also depicted schematically, turbofan engine 12 drives or enables various other accessory systems for an aircraft including turbofan engine 12. For example, turbofan engine 12 provides compressed air from the compressor section to a thermal management system 70. Although depicted schematically as coming from a location between LP compressor 24 and HP compressor 26, in certain exemplary aspects thermal management system 70 may receive compressed air from HP compressor 26, from an exit of HP compressor 26, or both.

It should be appreciated, however, that turbofan engine 12 depicted in FIG. 1 is by way of example only, and that in other exemplary embodiments, aspects of the present disclosure may additionally, or alternatively, be applied to any other suitable gas turbine engine. For example, in other exemplary embodiments, turbofan engine 12 may instead be any other suitable aeronautical gas turbine engine, such as a turbojet engine, turboshaft engine, turboprop engine, etc. Additionally, in still other exemplary embodiments, turbofan engine 12 may include or be operably connected to any other suitable accessory systems. Additionally, or alternatively, turbofan engine 12 may not include or be operably connected to one or more of the accessory systems discussed above.

Figure 2:
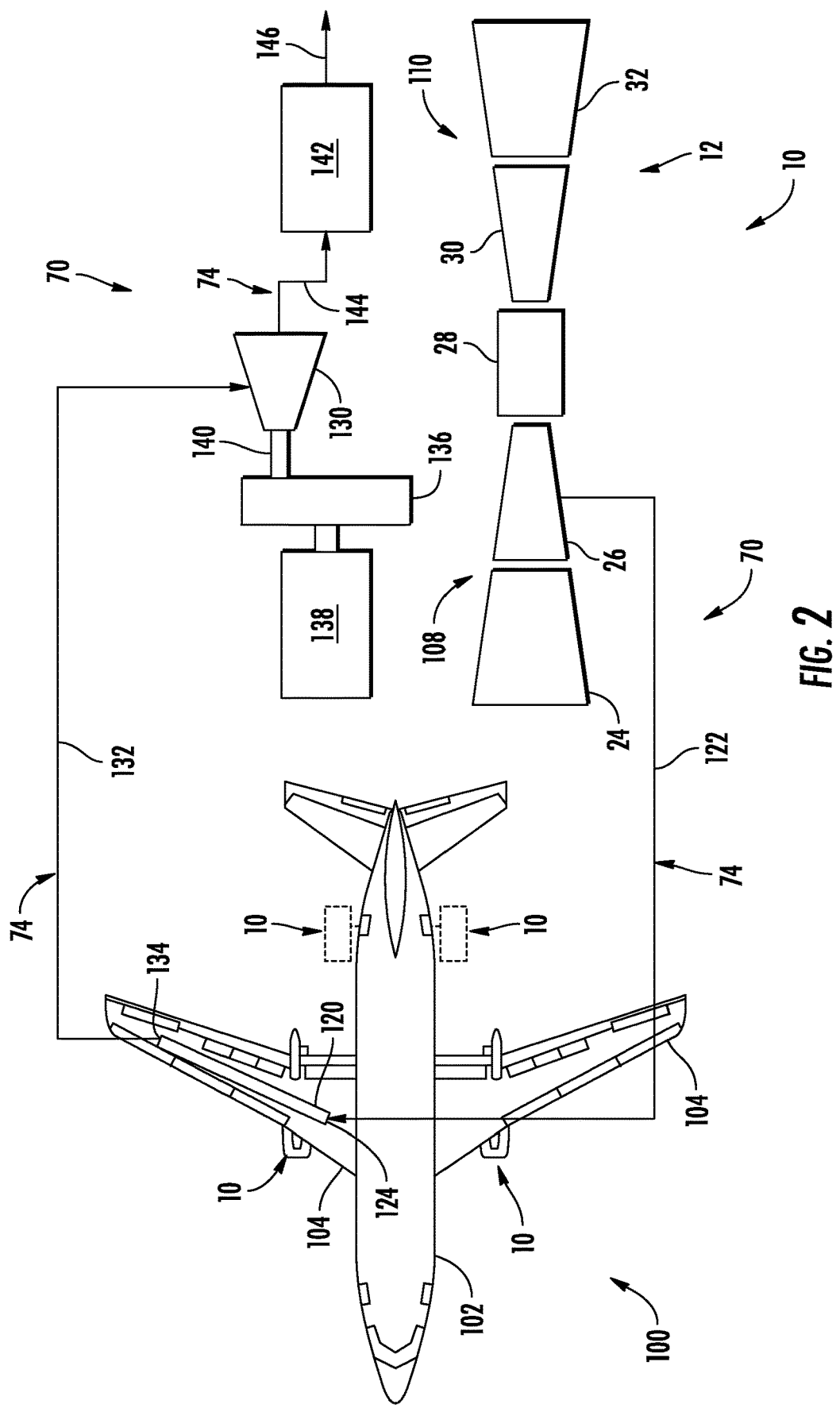
FIG. 2 is a simplified schematic view of a propulsion system and a thermal management system in accordance with an exemplary aspect of the present disclosure.

FIG. 2 is a simplified schematic view of an aircraft 100 depicting the propulsion system 10 with turbofan engine 12 and an exemplary embodiment of the thermal management system 70 in accordance with the present disclosure. In FIG. 2, the aircraft 100 includes a fuselage 102 and a pair of wings 104. In the illustrated embodiment, aircraft 100 includes a pair of wing-mounted propulsion systems 10 including the turbofan engine 12. However, it should be understood that the aircraft 100 may additionally or alternatively have fuselage-mounted propulsion systems 10. Turbofan engine 12 may be configured in substantially the same manner as the exemplary turbofan engine 12 of FIG. 1 having a compressor section 108 including the LP compressor 24 and the HP compressor 26, the combustion section 28, and a turbine section 110 including the HP turbine 30 and the LP turbine 32.

As shown, thermal management system 70 is a thermal energy management system. A thermal management system flow path 74 is defined by thermal management system 70 and is a flowpath for a flow of compressed fluid (e.g., bleed air) from a pressurized section of the turbofan engine 12 (e.g., from HP compressor 26) that flows to and/or through the components of thermal management system 70. In the illustrated embodiment, bleed air is extracted from HP compressor 26. However, it should be understood that the bleed air may be extracted from another pressurized section of the turbofan engine 12 and be of a suitable temperature for thermal energy transfer for a desired or particular function (e.g., an anti-ice function). Thermal management system 70 is configured to receive a flow of compressed fluid extracted from the compressor section 108 (e.g., from one or more stages at or aft of the HP compressor 26) through the thermal management system flowpath 74.

In the embodiment illustrated in FIG. 2, the thermal management system 70 includes an anti-ice system 120 thermally connected to the thermal management system flowpath 74 and to the compressor section 108. Anti-ice system 120 is fluidly connected to the HP compressor 26 via a line 122. Line 122 defines in part thermal management system flowpath 74. Line 122 is also fluidly connected to and extends from HP compressor 26 such that the anti-ice system 120 is downstream from the HP compressor 26 in the thermal management system flowpath 74. In the illustrated embodiment, a single anti-ice system 120 is depicted and is illustrated as a wing-mounted anti-ice system 120. However, it should be understood that the anti-ice system 120 may be mounted to each wing 104 and/or may be mounted elsewhere on the aircraft 100. In the illustrated embodiment, the anti-ice system 120 is configured to prevent ice formation on wings 104 and/or the nacelle 50 (FIG. 1) by feeding or flowing the high temperature/high pressure flow of compressed fluid extracted from the compressor section 108 to various ducts, chambers, or internal volumes (not shown) of the anti-ice system 120 located in the wings 104 and/or nacelles 50 (FIG. 1).

In operation, the flow of compressed fluid is extracted from the compressor section 108 and flows downstream in the thermal management system flowpath 74 via line 122 to an inlet 124 of the anti-ice system 120. In the illustrated embodiment, the flow of compressed fluid flows directly from the compressor section 108 to the anti-ice system 120. However, it should be understood that in some embodiments, the flow of pressurized fluid may be pre-cooled after being extracted from a pressurized section of the turbofan engine 12 and prior to being delivered to the anti-ice system 120 (e.g., using air-to-air heat exchangers in the fan stream or ram duct, engine fuel, or other vehicle heat exchangers). Thermal energy (e.g., heat) is extracted from the flow of compressed fluid flowing through the anti-ice system 120 such that the anti-ice system 120 functions as a pre-cooler or heat exchanger in the thermal management system 70 for the flow of compressed fluid flowing through the thermal management system flowpath 74.

In the illustrated embodiment, the thermal management system 70 includes an expansion turbine 130 thermally connected to the thermal management system flowpath 74 and to the anti-ice system 120. The expansion turbine 130 is fluidly connected to the anti-ice system 120 via a line 132. Line 132 defines in part thermal management system flowpath 74. Line 132 is also fluidly connected to and extends from an outlet 134 of the anti-ice system 120 such that the expansion turbine 130 is downstream from the anti-ice system 120 in the thermal management system flowpath 74. Thus, in operation, the flow of compressed fluid flows from the compressor section 108 to the anti-ice system 120, and then from the anti-ice system 120 downstream to the expansion turbine 130. The expansion turbine 130 is configured to expand the flow of compressed fluid received from the anti-ice system 120. As the expansion turbine 130 expands the flow of compressed fluid, the thermal energy of the flow of compressed fluid is reduced. In one example, the thermal energy of the expanded flow of fluid can be reduced so that a temperature of the expanded flow of fluid drops down to less than a temperature of ambient air.

Additionally, thermal management system 70 includes a gearbox 136 and a generator 138. Gearbox 136 is operably coupled to the expansion turbine 130 via a driveshaft 140. Gearbox 136 is configured to transfer rotational energy from expansion turbine 130 via the driveshaft 140 to the generator 138. For example, as expansion turbine 130 expands the flow of compressed fluid received from the anti-ice system 120, expansion turbine 130 (or an internal component thereof) rotates. As expansion turbine 130 rotates, torque is transferred from the expansion turbine 130 via the driveshaft 140 to the gearbox 136. Gearbox 136 can then then transfer the torque to other components of propulsion system 10 such as to the generator 138. In this way, expansion turbine 130 can provide torque to turbofan engine 12 via a mechanical means (e.g., via gearbox 136). In this example, generator 138 is an electrical generator. For example, as torque is transferred to generator 138, generator 138 converts the torque into electrical power for electric accessories or to increase a vehicle power source of propulsion system 10. In the illustrated embodiment, the expansion turbine 130 is depicted as being coupled to the gearbox 136. However, it should be understood that the expansion turbine 130 may be coupled to any type of load device (e.g., an electric machine, a mechanical drive device, a fluid flow device, pumps, etc.).

After the flow of compressed fluid from the anti-ice system 120 passes through the expansion turbine 130, the expanded flow of fluid then travels to a thermal load 142. The thermal load is thermally connected to the thermal management system flowpath 74 and to the expansion turbine 130. The thermal load 142 is fluidly connected to the expansion turbine 130 via a line 144. Line 144 defines in part thermal management system flowpath 74. Line 144 is also fluidly connected to and extends from the expansion turbine 130 such that the thermal load 142 is downstream from the expansion turbine 130 in the thermal management system flowpath 74. The thermal load 142 is a component or an element of a vehicle (e.g., the aircraft 100) to which propulsion system 10 is attached that utilizes the flow of fluid for thermal energy transfer. For example, the thermal load 142 can include one or more of a heat sink for vehicle heat rejection or a sink for a thermal management system of the engine such as oil cooling. A portion of the expanded flow of fluid may also be delivered to other systems of the aircraft 100 for vehicle thermal loads. After passing through the thermal load 142, the expanded flow of fluid can then be discharged from thermal load 142, depicted by 146, and delivered to LP turbine 32 for cooling and/or for clearance control of either HP turbine 30 or LP turbine 32. In other examples, the flow of fluid discharged from thermal load 142 can be delivered to one or more of an exhaust turbine (e.g., of fan nozzle exhaust section 68 (FIG. 1)), an active clearance control system, an engine bay, or be sent overboard to ambient.

In the illustrated embodiment, bleed air is extracted from HP compressor 26. However, it should be understood that the bleed air may be extracted from another pressurized section of the turbofan engine 12 (e.g., LP compressor 24 or elsewhere of the turbofan engine 12) such that a return pressure of the flow of pressurized fluid from the anti-ice system 120 is at a lower pressure than the input pressure of the flow of pressurized fluid to the anti-ice system 120. For example, in some embodiments, the bleed air may be extracted from a discharge plane of the HP compressor 26 and returned downstream from the anti-ice system 120 to an inlet of the HP compressor 26. In other embodiments, bleed air may be extracted from the LP compressor 24 and discharged downstream of the anti-ice system 120 to the fan stream (e.g., the bypass airflow passage 56).

Figure 3:
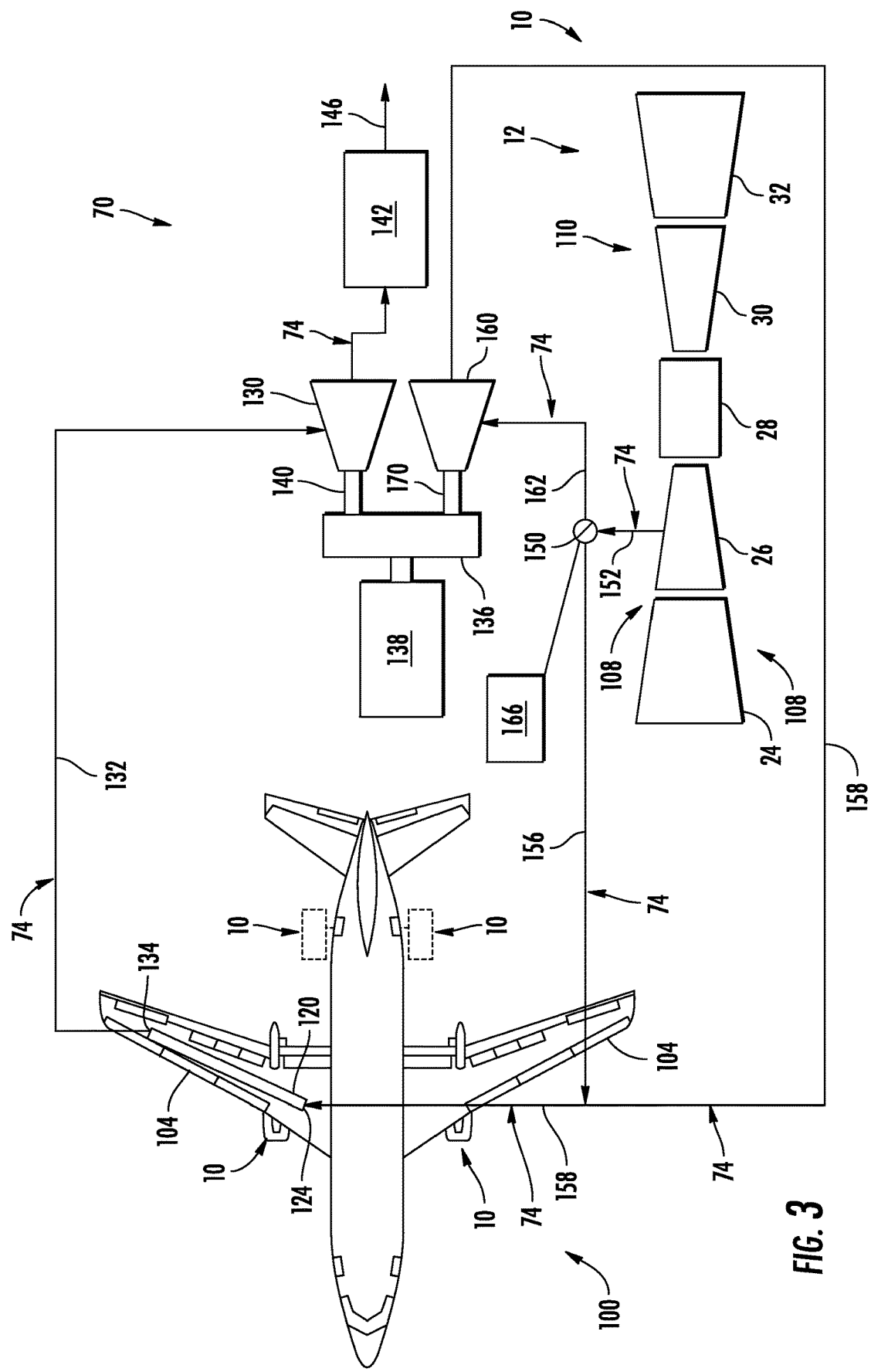
FIG. 3 is a simplified schematic view of a propulsion system and a thermal management system in accordance with another exemplary aspect of the present disclosure.

FIG. 3. is a simplified schematic view of the aircraft 100 depicting the propulsion system 10 with turbofan engine 12 and another exemplary embodiment of the thermal management system 70 in accordance with the present disclosure. In FIG. 3, the aircraft 100 includes the fuselage 102 and the pair of wings 104. In the illustrated embodiment, aircraft 100 includes a pair of wing-mounted propulsion systems 10 including the turbofan engine 12. However, it should be understood that the aircraft 100 may additionally or alternatively have fuselage-mounted propulsion systems 10. Turbofan engine 12 may be configured in substantially the same manner as the exemplary turbofan engine 12 of FIG. 1 having a compressor section 108 including the LP compressor 24 and the HP compressor 26, the combustion section 28, and a turbine section 110 including the HP turbine 30 and the LP turbine 32.

As shown, thermal management system 70 is a thermal energy management system. A thermal management system flowpath 74 is defined by thermal management system 70 and is a flowpath for a flow of compressed fluid (e.g., bleed air) from HP compressor 26 that flows to and/or through the components of thermal management system 70. Thermal management system 70 is configured to receive a flow of compressed fluid extracted from the compressor section 108 (e.g., from one or more stages at or aft of the HP compressor 26) through the thermal management system flowpath 74.

In the embodiment illustrated in FIG. 3, the thermal management system 70 includes a flow control device 150 thermally connected to the thermal management system flowpath 74, the compressor section 108 and the anti-ice system 120. The flow control device 150 is fluidly connected to the HP compressor 26 via a line 152. Line 152 defines in part thermal management system flowpath 74. Line 152 is also fluidly connected to and extends from HP compressor 26 such that the flow control device 150 is downstream from the HP compressor 26 in the thermal management system flowpath 74. In the illustrated embodiment, the flow control device 150 is a switch valve. The flow control device 150 is also fluidly connected to the anti-ice system 120 via lines 156 and 158. Lines 156 and 158 define in part thermal management system flowpath 74. Line 156 is fluidly connected to and extends from the flow control device 150, and line 158 is fluidly connected to the line 156 such that the anti-ice system 120 is downstream from the flow control device 150 in the thermal management system flowpath 74.

In the illustrated embodiment, a single anti-ice system 120 is depicted and is illustrated as a wing-mounted anti-ice system 120. However, it should be understood that the anti-ice system 120 may be mounted to each wing 104 and/or may be mounted elsewhere on the aircraft 100. In the illustrated embodiment, the anti-ice system 120 is configured to prevent ice formation on wings 104 and/or the nacelle 50 (FIG. 1) by feeding or flowing the high temperature/high pressure flow of compressed fluid extracted from the compressor section 108 to various ducts, chambers, or internal volumes (not shown) of the anti-ice system 120 located in the wings 104 and/or nacelles 50 (FIG. 1).

Thermal management system 70 also includes an expansion turbine 160 thermally connected to the thermal management system flowpath 74 and to the flow control device 150. The expansion turbine 160 is fluidly connected to the flow control device 150 via a line 162, and the expansion turbine 160 is fluidly connected to the anti-ice system 120 via the line 158. Line 162 defines in part thermal management system flowpath 74. Line 162 is also fluidly connected to and extends from the flow control device 150 such that the expansion turbine 160 is downstream from the flow control device 150 in the thermal management system flowpath 74. Line 158 is also fluidly connected to and extends from the expansion turbine 160 such that the anti-ice system 120 is downstream from the expansion turbine 160 in the thermal management system flowpath 74.

In operation, the flow of compressed fluid is extracted from the compressor section 108 and flows downstream in the thermal management system flowpath 74 via the line 152 to the flow control device 150. The flow control device 150 is used to selectively control the flow of compressed fluid received from the compressor section 108 to either the expansion turbine 160 or the anti-ice system 120. For example, based on a pressure parameter of the flow of compressed fluid received from the compressor section 108, the pressure parameter of the flow of compressed fluid may need to be reduced before being delivered to the anti-ice system 120. In such a case (e.g., at high power conditions), the flow of compressed fluid is directed to the expansion turbine 160. The expansion turbine 160 is configured to expand the flow of compressed fluid received from the flow control device 150. As the expansion turbine 160 expands the flow of compressed fluid, the thermal energy or temperature parameter and the pressure parameter of the flow of compressed fluid is reduced. In the illustrated embodiment, expansion turbine 160 partially expands the flow of compressed fluid such that the flow of compressed fluid remains at a pressure parameter and temperature parameter to facilitate thermal energy transfer at a location downstream of the expansion turbine 160. Thus, in operation, expansion turbine 160 throttles down the pressure and temperature parameters of the flow of compressed fluid to a desired or predetermined level. The flow control device 150 may be operably controlled by a computing device or controller, such as one or more computing systems 166. It should be understood that in some embodiments, the expansion turbine 160 (and driveshaft 170) may be replaced with a heat exchanger to facilitate a temperature parameter reduction of the flow of compressed fluid before passing the flow of compressed fluid to the anti-ice system 120.

After the flow of compressed fluid received from the compressor section 108 via the flow control device 150 passes through the expansion turbine 160, the flow of compressed fluid then flows to the anti-ice system 120 via the line 158. As described above, flow control device 150 is used to selectively control the flow of compressed fluid received from the compressor section 118 to direct the flow of compressed fluid either to the expansion turbine 160 or directly from the compressor section 108 to the anti-ice system 120 (e.g., via lines 156 and 158). For example, at low engine power and/or lower pressure parameters, the flow of compressed fluid may flow directly to the anti-ice system 120 without a pressure parameter reduction.

Similar to as described above in connection with FIG. 2, the flow of compressed fluid is received at the inlet 124 of the anti-ice system 120. Thermal energy (e.g., heat) is extracted from the flow of compressed fluid flowing through the anti-ice system 120 such that the anti-ice system 120 functions as a pre-cooler or heat exchanger in the thermal management system 70 for the flow of compressed fluid flowing through the thermal management system flowpath 74.

In the illustrated embodiment, the thermal management system 70 also includes the expansion turbine 130 thermally connected to the thermal management system flowpath 74 and to the anti-ice system 120. The expansion turbine 130 is fluidly connected to the anti-ice system 120 via the line 132. Line 132 defines in part thermal management system flowpath 74. Line 132 is also fluidly connected to and extends from the outlet 134 of the anti-ice system 120 such that the expansion turbine 130 is downstream from the anti-ice system 120 in the thermal management system flowpath 74. Thus, in operation, the flow of compressed fluid flows from the compressor section 108 to the anti-ice system 120, either directly from the compressor section 108 or after being passed through the expansion turbine 160, and then from the anti-ice system 120 downstream to the expansion turbine 130. The expansion turbine 130 is configured to expand the flow of compressed fluid received from the anti-ice system 120. As the expansion turbine 130 expands the flow of compressed fluid, the thermal energy of the flow of compressed fluid is reduced. In one example, the thermal energy of the expanded flow of fluid can be reduced so that a temperature of the expanded flow of fluid drops down to less than a temperature of ambient air.

Additionally, thermal management system 70 includes the gearbox 136 and the generator 138. Gearbox 136 is operably coupled to the expansion turbine 130 via the driveshaft 140. Gearbox 136 is configured to transfer rotational energy from expansion turbine 130 via the driveshaft 140 to the generator 138. For example, as expansion turbine 130 expands the flow of compressed fluid received from the anti-ice system 120, expansion turbine 130 (or an internal component thereof) rotates. As expansion turbine 130 rotates, torque is transferred from the expansion turbine 130 via the driveshaft 140 to the gearbox 136. Gearbox 136 can then then transfer the torque to other components of propulsion system 10 such as to the generator 138. In this way, expansion turbine 130 can provide torque to turbofan engine 12 via a mechanical means (e.g., via gearbox 136). In this example, generator 138 is an electrical generator. For example, as torque is transferred to generator 138, generator 138 converts the torque into electrical power for electric accessories or to increase a vehicle power source of propulsion system 10. In the illustrated embodiment, the expansion turbine 130 is depicted as being coupled to the gearbox 136. However, it should be understood that the expansion turbine 130 may be coupled to any type of load device (e.g., an electric machine, a mechanical drive device, a fluid flow device, pumps, etc.).

In FIG. 3, expansion turbine 160 is also operable coupled to the gearbox 136 via a driveshaft 170. Gearbox 136 is configured to transfer rotational energy from expansion turbine 160 via the driveshaft 170 to the generator 138. For example, as expansion turbine 160 expands the flow of compressed fluid received from the compressor section 108, expansion turbine 160 (or an internal component thereof) rotates. As expansion turbine 160 rotates, torque is transferred from the expansion turbine 160 via the driveshaft 170 to the gearbox 136. In the illustrated embodiment, expansion turbines 130 and 160 are each operably coupled to the gearbox 136 via distinct driveshafts 140 and 170. However, it should be understood that a single driveshaft may be operable coupled to both expansion turbines 130 and 160 to provide an output torque to the gearbox 136.

After the flow of compressed fluid from the anti-ice system 120 passes through the expansion turbine 130, the expanded flow of fluid then travels to the thermal load 142. The thermal load is thermally connected to the thermal management system flowpath 74 and to the expansion turbine 130. The thermal load 142 is fluidly connected to the expansion turbine 130 via the line 144. Line 144 defines in part thermal management system flowpath 74. Line 144 is also fluidly connected to and extends from the expansion turbine 130 such that the thermal load 142 is downstream from the expansion turbine 130 in the thermal management system flowpath 74. The thermal load 142 is a component or an element of a vehicle (e.g., the aircraft 100) to which propulsion system 10 is attached that utilizes the flow of fluid for thermal energy transfer. For example, the thermal load 142 can include one or more of a heat sink for vehicle heat rejection or a sink for a thermal management system of the engine such as oil cooling. A portion of the expanded flow of fluid may also be delivered to other systems of the aircraft 100 for vehicle thermal loads. After passing through the thermal load 142, the expanded flow of fluid can then be discharged from thermal load 142, depicted by 146, and delivered to LP turbine 32 for cooling and/or for clearance control of either HP turbine 30 or LP turbine 32. In other examples, the flow of fluid discharged from thermal load 142 can be delivered to one or more of an exhaust turbine (e.g., of fan nozzle exhaust section 68 (FIG. 1)), an active clearance control system, an engine bay, or be sent overboard to ambient.

Figure 4:
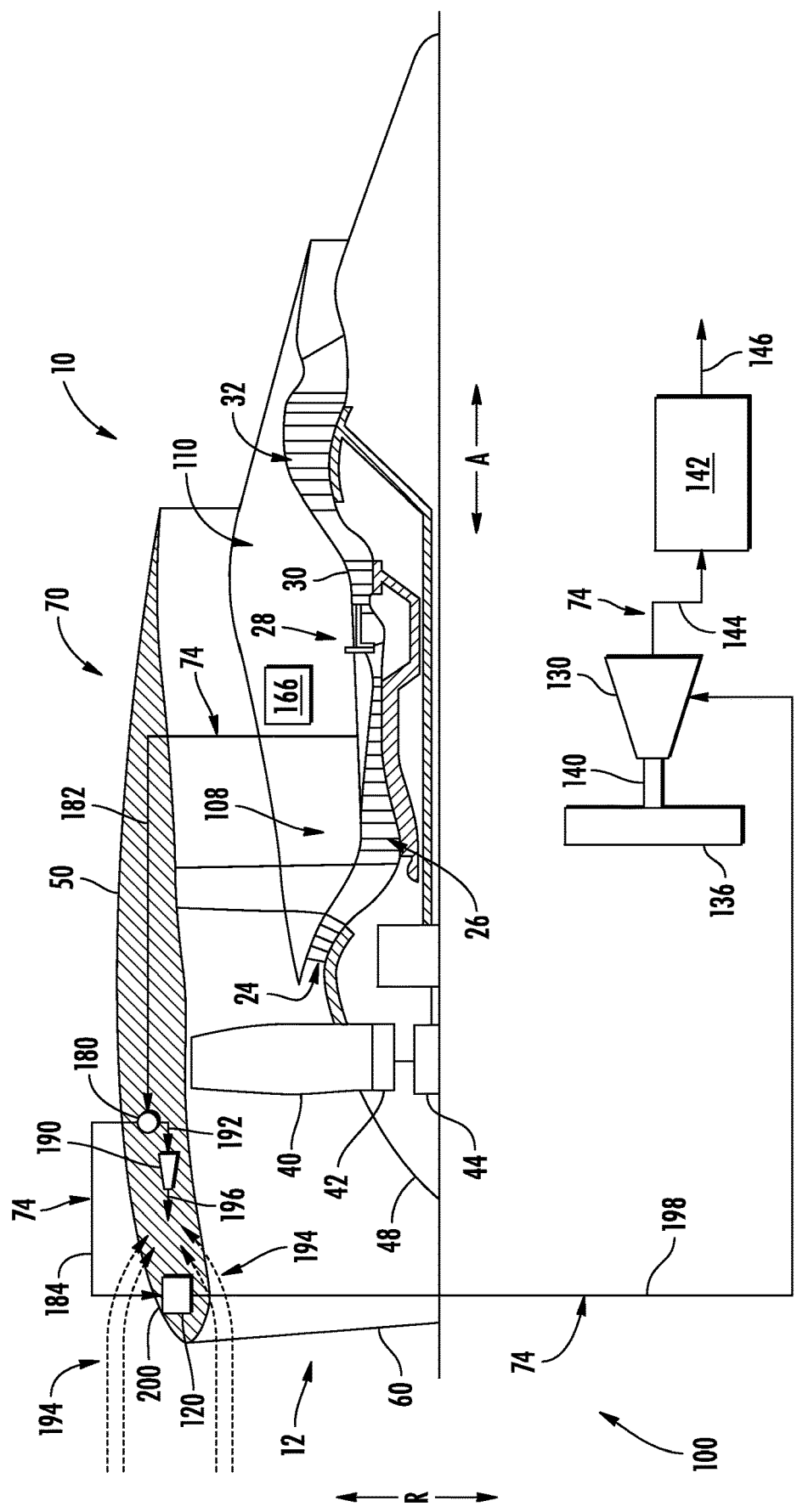
FIG. 4 is a simplified schematic view of a propulsion system and a thermal management system in accordance with yet another exemplary aspect of the present disclosure.

FIG. 4 is a simplified schematic view of the aircraft 100 depicting the propulsion system 10 with turbofan engine 12 and another exemplary embodiment of the thermal management system 70 in accordance with the present disclosure. Turbofan engine 12 may be configured in substantially the same manner as the exemplary turbofan engine 12 of FIG. 1 having a compressor section 108 including the LP compressor 24 and the HP compressor 26, the combustion section 28, and a turbine section 110 including the HP turbine 30 and the LP turbine 32.

In the embodiment illustrated in FIG. 4, thermal management system 70 is a thermal energy management system. The thermal management system flowpath 74 is defined by thermal management system 70 and is a flowpath for a flow of compressed fluid (e.g., bleed air) from HP compressor 26 that flows to and/or through the components of thermal management system 70. Thermal management system 70 is configured to receive a flow of compressed fluid extracted from the compressor section 108 (e.g., from one or more stages at or aft of the HP compressor 26) through the thermal management system flowpath 74.

In the embodiment illustrated in FIG. 4, the thermal management system 70 includes a flow control device 180 thermally connected to the thermal management system flowpath 74 and to the compressor section 108. The flow control device 180 is fluidly connected to the HP compressor 26 via a line 182. Line 182 defines in part thermal management system flowpath 74. Line 182 is also fluidly connected to and extends from HP compressor 26 such that the flow control device 180 is downstream from the HP compressor 26 in the thermal management system flowpath 74. In the illustrated embodiment, the flow control device 180 is a switch valve.

In FIG. 4, the thermal management system 70 includes the anti-ice system 120 thermally connected to the thermal management system flowpath 74 and to the flow control device 180. Anti-ice system 120 is fluidly connected to the flow control device 180 via a line 184. Line 184 defines in part thermal management system flowpath 74. Line 184 is also fluidly connected to and extends from flow control device 180 such that the anti-ice system 120 is downstream from the flow control device 180 in the thermal management system flowpath 74. In the illustrated embodiment, the anti-ice system 120 is depicted as having at least a portion thereof disposed within the nacelle 50. However, it should be understood that the anti-ice system 120 may provide anti-ice functionality to other parts of the aircraft 100. In the illustrated embodiment, the anti-ice system 120 is configured to prevent ice formation on the nacelle 50 by feeding or flowing the high temperature/high pressure flow of compressed fluid extracted from the compressor section 108 to various ducts, chambers, or internal volumes (not shown) of the anti-ice system 120 located in the nacelles 50. In operation, the flow of compressed fluid is extracted from the compressor section 108 and flows downstream in the thermal management system flowpath 74 via line 182 to the flow control device 180. The flow control device 180 is used to selectively control a flow of the compressed fluid to the anti-ice system 120. The flow control device 180 may be operably controlled by a computing device or controller, such as by one or more computing systems 166. Thermal energy (e.g., heat) is extracted from the flow of compressed fluid flowing through the anti-ice system 120 such that the anti-ice system 120 functions as a pre-cooler or heat exchanger in the thermal management system 70 for the flow of compressed fluid flowing through the thermal management system flowpath 74.

In the illustrated embodiment, the thermal management system 70 includes an ejector 190 thermally connected to the thermal management system flowpath 74 and to the flow control device 180. The ejector 190 is fluidly connected to the flow control device 180 via a line 192. Line 192 defines in part thermal management system flowpath 74. Line 192 is also fluidly connected to and extends from flow control device 180 such that the ejector 190 is downstream from the flow control device 180 in the thermal management system flowpath 74. In the illustrated embodiment, the ejector 190 is a low pressure-ratio ejector located within the nacelle and operable to entrain an ingested flow of fluid 194 into the nacelle 50. For example, in some embodiments, a low-pressure discharge flow of fluid 196 from the ejector 190 from the flow of compressed fluid passing through the ejector 190 causes the ingestion of a boundary layer airflow through one or more orifices located in an exterior surface 200 of the nacelle 50. In some embodiment, the ingested flow of fluid 194 provides additional thermal energy transfer by transferring thermal energy from the flow of compressed fluid entering and/or flowing through the anti-ice system 120. As described above, the flow control device 180 is used to selectively flow all or a portion of the flow of compressed fluid received from the compressor section 108 between the ejector 190 and the anti-ice system 120. For example, the flow control device 180 may be used to switch a flow of the flow of compressed fluid between the ejector 90 and the anti-ice system 120, or the flow control device 180 may be used to direct a first portion of the flow of compressed fluid to the ejector 90 while directing a second portion of the flow of compressed fluid to the anti-ice system 120.

In the illustrated embodiment, the thermal management system 70 includes the expansion turbine 130 thermally connected to the thermal management system flowpath 74 and to the anti-ice system 120. The expansion turbine 130 is fluidly connected to the anti-ice system 120 via a line 198. Line 198 defines in part thermal management system flowpath 74. Line 198 is also fluidly connected to and extends from the anti-ice system 120 such that the expansion turbine 130 is downstream from the anti-ice system 120 in the thermal management system flowpath 74.

As described above, in operation, the flow of compressed fluid flows from the compressor section 108 to the anti-ice system 120 (e.g., via the flow control device 180), and then from the anti-ice system 120 downstream to the expansion turbine 130. The expansion turbine 130 is configured to expand the flow of compressed fluid received from the anti-ice system 120. As the expansion turbine 130 expands the flow of compressed fluid, the thermal energy of the flow of compressed fluid is reduced. In one example, the thermal energy of the expanded flow of fluid can be reduced so that a temperature of the expanded flow of fluid drops down to less than a temperature of ambient air.

Additionally, the thermal management system 70 includes the gearbox 136. Gearbox 136 is operably coupled to the expansion turbine 130 via the driveshaft 140. Gearbox 136 is configured to transfer rotational energy from expansion turbine 130 via the driveshaft 140 to a load device, such as the generator 138 (FIGS. 2 and 3). For example, as expansion turbine 130 expands the flow of compressed fluid received from the anti-ice system 120, expansion turbine 130 (or an internal component thereof) rotates. As expansion turbine 130 rotates, torque is transferred from the expansion turbine 130 via the driveshaft 140 to a load device. Gearbox 136 can then transfer the torque to other components of propulsion system 10 such as to the generator 138 (FIGS. 2 and 3) or any type of load device (e.g., an electric machine, a mechanical drive device, a fluid flow device, pumps, etc.). In this way, expansion turbine 130 can provide torque to turbofan engine 12 via a mechanical means (e.g., via gearbox 136).

After the flow of compressed fluid from the anti-ice system 120 passes through the expansion turbine 130, the expanded flow of fluid then travels to the thermal load 142. The thermal load is thermally connected to the thermal management system flowpath 74 and to the expansion turbine 130. The thermal load 142 is fluidly connected to the expansion turbine 130 via the line 144. Line 144 defines in part thermal management system flowpath 74. Line 144 is also fluidly connected to and extends from the expansion turbine 130 such that the thermal load 142 is downstream from the expansion turbine 130 in the thermal management system flowpath 74. The thermal load 142 is a component or an element of a vehicle (e.g., the aircraft 100) to which propulsion system 10 is attached that utilizes the flow of fluid for thermal energy transfer. For example, the thermal load 142 can include one or more of a heat sink for vehicle heat rejection or a sink for a thermal management system of the engine such as oil cooling. A portion of the expanded flow of fluid may also be delivered to other systems of the aircraft 100 for vehicle thermal loads. After passing through the thermal load 142, the expanded flow of fluid can then be discharged from thermal load 142, depicted by 146, and delivered to LP turbine 32 for cooling and/or for clearance control of either HP turbine 30 or LP turbine 32. In other examples, the flow of fluid discharged from thermal load 142 can be delivered to one or more of an exhaust turbine (e.g., of fan nozzle exhaust section 68 (FIG. 1)), an active clearance control system, an engine bay, or be sent overboard to ambient.

In some embodiments, the thermal management system 70 is configured to collect and/or mix the flow of compressed fluid exiting the anti-ice system 120 with the discharge flow of fluid from the ejector 190 and/or with the ingested flow of fluid 194 and flow the mixed flow of fluid to the expansion turbine 130. For example, in some embodiments, the thermal management system 70 may include a system of valves, manifolds, or other devices/systems (not shown) to collect and/or mix the flow of compressed fluid exiting the anti-ice system 120 with the discharge flow of fluid from the ejector 190 and/or with the ingested flow of fluid 194. The mixed flow of fluid is then used for thermal energy transfer purposes (e.g., generate cooling fluid) via the expansion turbine 130.

Figure 5:
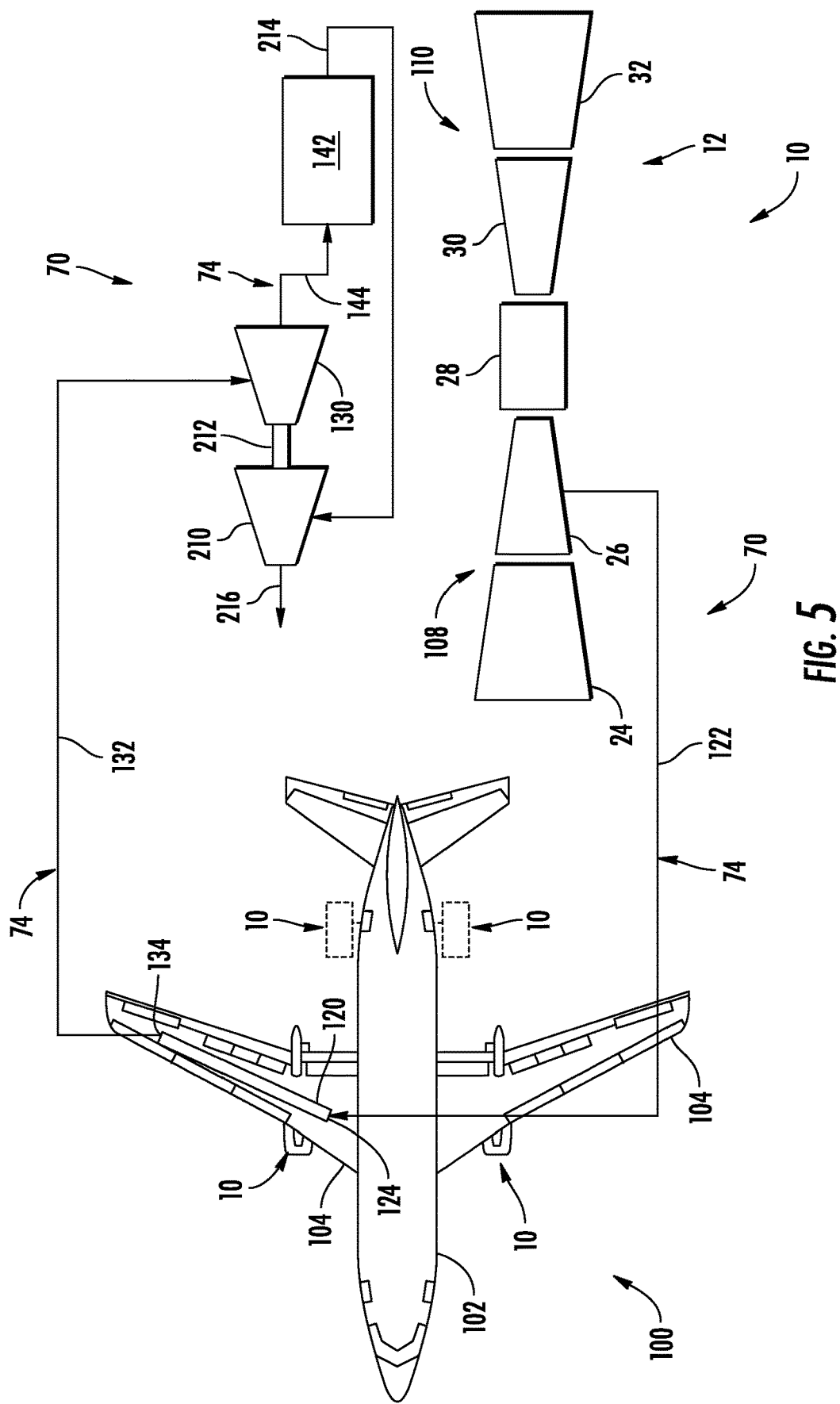
FIG. 5 is a simplified schematic view of a propulsion system and a thermal management system in accordance with yet another exemplary aspect of the present disclosure.

FIG. 5. is a simplified schematic view of the aircraft 100 depicting the propulsion system 10 with turbofan engine 12 and another exemplary embodiment of the thermal management system 70 in accordance with the present disclosure. In FIG. 5, the aircraft 100 and the propulsion system 10 with turbofan engine 12 may be configured in substantially the same manner as the exemplary aircraft 100 and propulsion system with turbofan engine 12 of FIG. 1 having a compressor section 108 including the LP compressor 24 and the HP compressor 26, the combustion section 28, a turbine section 110 including the HP turbine 30 and the LP turbine 32, and the anti-ice system 120.

As shown, thermal management system 70 is a thermal energy management system. A thermal management system flowpath 74 is defined by thermal management system 70 and is a flowpath for a flow of compressed fluid (e.g., bleed air) from HP compressor 26 that flows to and/or through the components of thermal management system 70. Thermal management system 70 is configured to receive a flow of compressed fluid extracted from the compressor section 108 (e.g., from one or more stages at or aft of the HP compressor 26) through the thermal management system flowpath 74.

In the embodiment illustrated in FIG. 5, the thermal management system 70 includes the anti-ice system 120 thermally connected to the thermal management system flowpath 74 and to the compressor section 108. The anti-ice system 120 is fluidly connected to the HP compressor 26 via the line 122. Line 122 defines in part thermal management system flowpath 74. Line 122 is also fluidly connected to and extends from HP compressor 26 such that the anti-ice system 120 is downstream from the HP compressor 26 in the thermal management system flowpath 74. In the illustrated embodiment, a single anti-ice system 120 is depicted and is illustrated as a wing-mounted anti-ice system 120. However, it should be understood that the anti-ice system 120 may be mounted to each wing 104 and/or may be mounted elsewhere on the aircraft 100.

In operation, the flow of compressed fluid is extracted from the compressor section 108 and flows downstream in the thermal management system flowpath 74 via line 122 to the inlet 124 of the anti-ice system 120. In the illustrated embodiment, the flow of compressed fluid flows directly from the compressor section 108 to the anti-ice system 120. However, it should be understood that in some embodiments, the flow of pressurized fluid may be pre-cooled after being extracted from a pressurized section of the turbofan engine 12 and prior to being delivered to the anti-ice system 120 (e.g., using air-to-air heat exchangers in the fan stream or ram duct, engine fuel, or other vehicle heat exchangers). Thermal energy (e.g., heat) is extracted from the flow of compressed fluid flowing through the anti-ice system 120 such that the anti-ice system 120 functions as a pre-cooler or heat exchanger in the thermal management system 70 for the flow of compressed fluid flowing through the thermal management system flowpath 74.

In the illustrated embodiment, the thermal management system 70 includes the expansion turbine 130 thermally connected to the thermal management system flowpath 74 and to the anti-ice system 120. The expansion turbine 130 is fluidly connected to the anti-ice system 120 via the line 132. Line 132 defines in part thermal management system flowpath 74. Line 132 is also fluidly connected to and extends from the outlet 134 of the anti-ice system 120 such that the expansion turbine 130 is downstream from the anti-ice system 120 in the thermal management system flowpath 74. Thus, in operation, the flow of compressed fluid flows from the compressor section 108 to the anti-ice system 120, and then from the anti-ice system 120 downstream to the expansion turbine 130. The expansion turbine 130 is configured to expand the flow of compressed fluid received from the anti-ice system 120. As the expansion turbine 130 expands the flow of compressed fluid, the thermal energy of the flow of compressed fluid is reduced. In one example, the thermal energy of the expanded flow of fluid can be reduced so that a temperature of the expanded flow of fluid drops down to less than a temperature of ambient air.

In FIG. 5, thermal management system 70 includes a compressor 210.

Compressor 210 is drivable connected to the expansion turbine 130 via a driveshaft 212. Rotational energy from expansion turbine 130 is transferred to the compressor 210 via the driveshaft 140 to drive the compressor 210. For example, as expansion turbine 130 expands the flow of compressed fluid received from the anti-ice system 120, expansion turbine 130 (or an internal component thereof) rotates. As expansion turbine 130 rotates, torque is transferred from the expansion turbine 130 via the driveshaft 212 to the compressor 210.

After the flow of compressed fluid from the anti-ice system 120 passes through the expansion turbine 130, the expanded flow of fluid then travels to a thermal load 142. The thermal load is thermally connected to the thermal management system flowpath 74 and to the expansion turbine 130. The thermal load 142 is fluidly connected to the expansion turbine 130 via the line 144. Line 144 defines in part thermal management system flowpath 74. Line 144 is also fluidly connected to and extends from the expansion turbine 130 such that the thermal load 142 is downstream from the expansion turbine 130 in the thermal management system flowpath 74. The thermal load 142 is a component or an element of a vehicle (e.g., the aircraft 100) to which propulsion system 10 is attached that utilizes the flow of fluid for thermal energy transfer. For example, the thermal load 142 can include one or more of a heat sink for vehicle heat rejection or a sink for a thermal management system of the engine such as oil cooling. A portion of the expanded flow of fluid may also be delivered to other systems of the aircraft 100 for vehicle thermal loads.

In the illustrated embodiment, the thermal load 142 is fluidly connected to the compressor 210 via a line 214. Line 214 defines in part thermal management system flowpath 74. Line 214 is also fluidly connected to and extends from the thermal load 142 such that the compressor 210 is downstream from the thermal load 142. In operation, after passing through the thermal load 142, the expanded flow of fluid flows from the thermal load 142 to the compressor 210 via the line 214. The expanded flow of fluid is then compressed or re-compressed by the compressor 210 to generate another flow of compressed fluid, depicted by 216. In some embodiments, the flow of compressed fluid 216 may be returned to the turbofan engine 12 as part of a propulsive flow (e.g., entering the bypass airflow passage 56 (FIG. 1), turbine section 110, or elsewhere).

Figure 6:
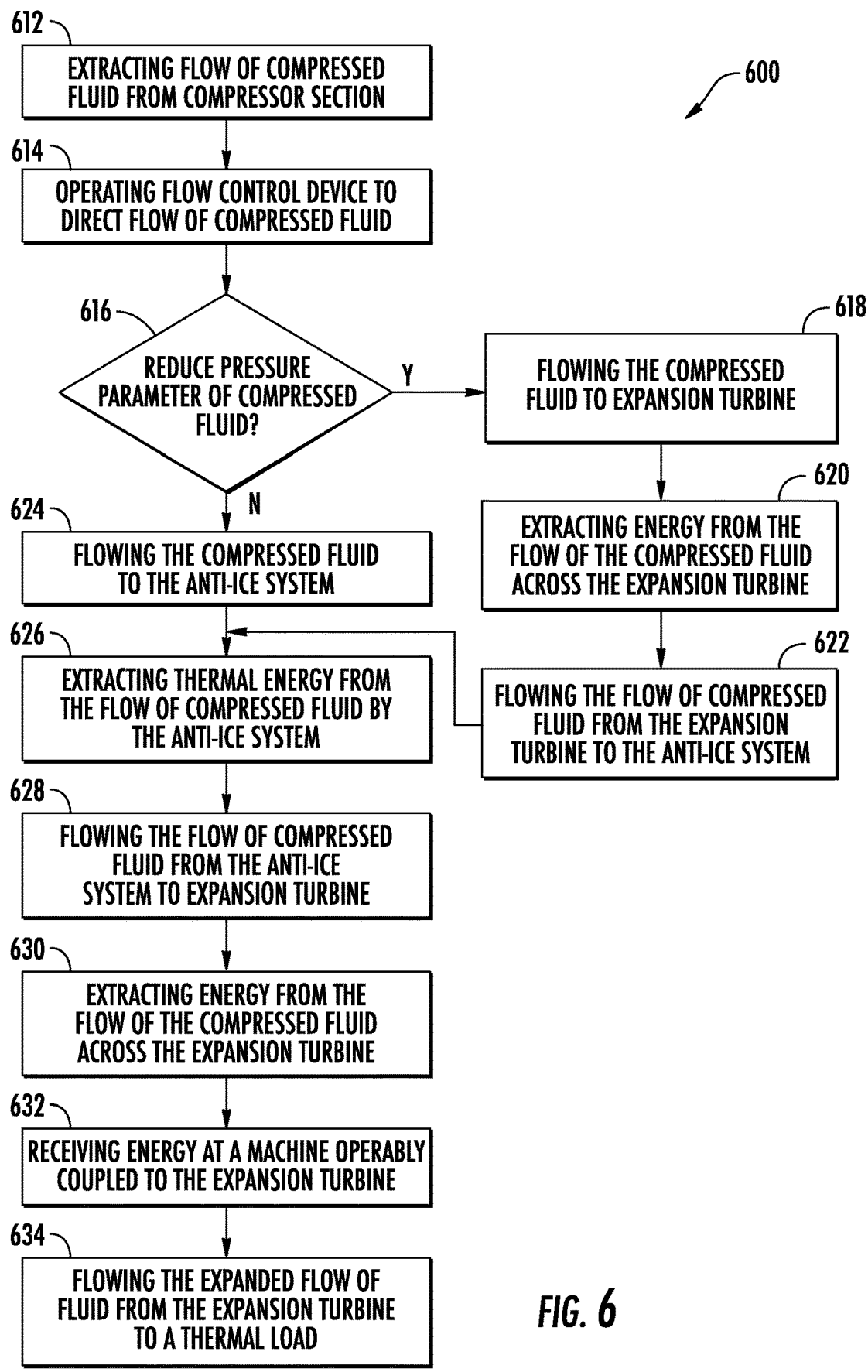
FIG. 6 is a schematic flowchart outlining a method for operation of a propulsion system and thermal management system in accordance with an exemplary aspect of the present disclosure.

Referring now to FIG. 6, a flowchart outlining steps for a method for operation of a propulsion system and a thermal energy management system (hereinafter, "method 600") is provided. The steps of the method 600 may be stored as instructions in memory of a computing device or controller, such as one or more computing systems 166 (FIG. 3) of the propulsion system 10 (FIG. 3) or aircraft 100 (FIG. 3). The computing system 166 may include one or more processors operably coupled to the memory to execute the instructions to perform operations at various embodiments of the propulsion system or aircraft such as provided herein. Various embodiments of the methods provided herein may be computer-implemented methods executable by the computing system 166.

The operations include at 612 extracting a flow of compressed fluid from the compressor section 108. At 614, the method includes operating the flow control device 150 to direct the flow of the compressed fluid based on a pressure parameter of the compressed fluid. At 616, the method includes determining whether the pressure parameter of the flow of compressed fluid should be reduced. If so, the method proceeds to 618, where the method includes flowing the flow of compressed fluid to the expansion turbine 160.

At 620, the method includes extracting energy from the flow of compressed fluid flowing across the expanding turbine 160. For example, flowing the flow of compressed fluid across the expansion turbine 160 will reduce the pressure parameter of the compressed fluid. At 622, the method includes flowing the flow of compressed fluid from the expansion turbine 160 to the anti-ice system 120. The method then proceeds from 622 to 626.

At 616, if the pressure parameter of the flow of compressed fluid does not need to be reduced, the method continues to 624, where the method includes flowing the flow of compressed fluid to the anti-ice system 120. At 626, the method includes extracting thermal energy from the flow of compressed fluid by the anti-ice system 120. At 628, the method includes flowing the flow of compressed fluid from the anti-ice system 120 to the expansion turbine 130. At 630, the method includes extracting energy from flowing the flow of the compressed fluid across the expansion turbine 130. At 632, the method includes receiving energy at a machine (e.g., the gearbox 136 and/or generator 138) operably coupled to the expansion turbine 130. At 634, the method includes flowing the expanded flow of fluid from the expansion turbine 130 to a thermal load 142.

Figure 7:
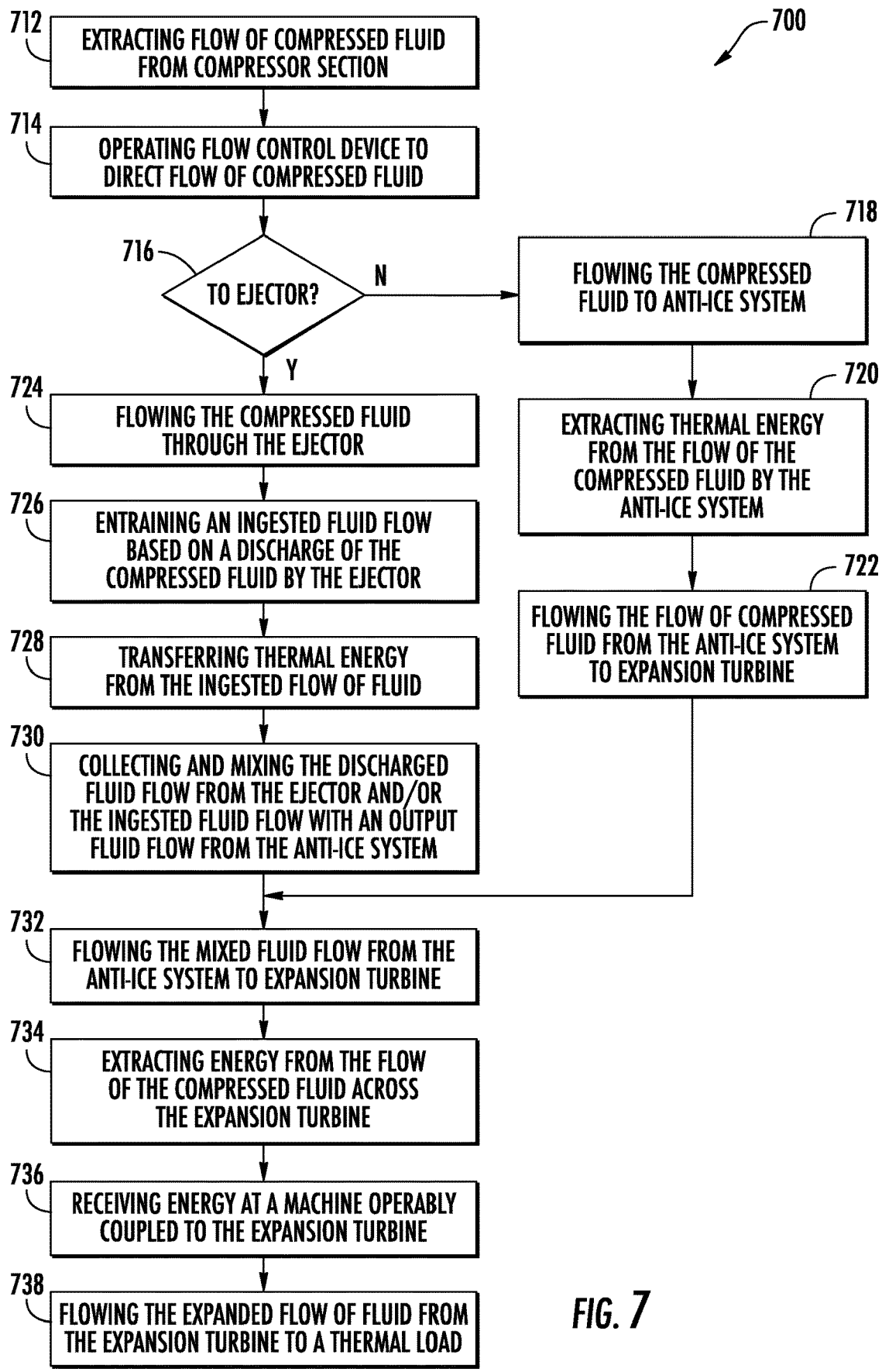
FIG. 7 is a schematic flowchart outlining a method for operation of a propulsion system and thermal management system in accordance with another exemplary aspect of the present disclosure.

Referring now to FIG. 7, a flowchart outlining steps for a method for operation of a propulsion system and a thermal energy management system (hereinafter, "method 700") is provided. The steps of the method 700 may be stored as instructions in memory of a computing device or controller, such as one or more computing systems 166 of the propulsion system 10 or aircraft 100. The computing system 166 may include one or more processors operably coupled to the memory to execute the instructions to perform operations at various embodiments of the propulsion system or aircraft such as provided herein. Various embodiments of the methods provided herein may be computer-implemented methods executable by the computing system 166.

The operations include at 712 extracting a flow of compressed fluid from the compressor section 108. At 714, the method includes operating the flow control device 180 to direct the flow of the compressed fluid to the ejector 190 and/or the anti-ice system 120. At 716, the method includes determining whether to send all or a portion the flow of compressed fluid to the ejector 190. If the flow of compressed fluid is to bypass the ejector 190, the method continues to 718, where the method includes flowing the flow of compressed fluid to the anti-ice system 120. At 720, the method includes extracting thermal energy from the flow of compressed fluid by the anti-ice system 120. At 722, the method includes flowing the flow of compressed fluid from the anti-ice system 120 to the expansion turbine 130. The method then proceeds from 722 to 732.

If at 716 all or a portion of the flow of compressed fluid is to be directed to the ejector 190, the method proceeds to 724, where the method includes flowing the flow of compressed fluid through the ejector 190. At 726, the method includes entraining an ingested flow of fluid based on a discharge flow of compressed fluid from the ejector 190. At 728, the method includes transferring thermal energy from the ingested flow of fluid (e.g., using the ingested flow of fluid to provide cooling to the flow of compressed fluid received from the compressor section 108 or used for other thermal energy transfer purposes). At 730, the method includes collecting and mixing the discharge flow of fluid from the ejector 190 and/or the ingested flow of fluid entrained by the ejector 190 with the flow of compressed fluid exiting the anti-ice system 120.

At 732, the method includes flowing the mixed flow of fluid from the anti-ice system 120 to the expansion turbine 130. At 734, the method includes extracting energy from flowing the flow of the compressed fluid across the expansion turbine 130. At 736, the method includes receiving energy at a machine (e.g., the gearbox 136 and/or generator 138) operably coupled to the expansion turbine 130. At 738, the method includes flowing the expanded flow of fluid from the expansion turbine 130 to a thermal load 142.

Thus, embodiments, the disclosed thermal management systems take bleed air from a pressurized section of the propulsion system and use an anti-ice system of the vehicle as a pre-cooler of the bleed air. The bleed air flows through the anti-ice system and is then routed to an expansion turbine. The bleed air from the anti-ice system is expanded by the expansion turbine to generate rotational energy that is transferred from the expansion turbine to power a load device. The expanded bleed air flows downstream from the expansion turbine to a thermal load to provide thermal energy transfer for one or more devices or systems of the vehicle. Bleed air extracted from a pressurized section of the propulsion system has a temperature suitable to provide thermal energy transfer to a heating-demand device of the vehicle (e.g., an anti-ice system) before expanding the bleed air for engine cooling uses. Such a configuration has a dual benefit to various aerodynamic surfaces (e.g., providing anti-icing of such surfaces), while also reducing a temperature of an airflow to be used for cooling purposes. Additionally, using an anti-ice system (e.g., a wing anti-ice system) as a thermal management system pre-cooler eliminates and/or reduces propulsive efficiency penalties that may otherwise be incurred by introducing additional heat exchangers, such as surface coolers or ram duct scoops delivering a flow to plate-fin style brick coolers. Moreover, embodiments of the present disclosure utilize an aerodynamic surface (e.g., a wing) as a heat sink to ambient air that has a large surface area and low propulsive efficiency drag penalty.

Further aspects are provided by the subject matter of the following clauses:

A method for thermal management for an aircraft, the method comprising: extracting a flow of compressed fluid from a compressor section of a propulsion system; passing the flow of compressed fluid through an anti-ice system; flowing the flow of compressed fluid from the anti-ice system to a turbine; expanding the flow of compressed fluid across the turbine; and flowing the expanded flow of compressed fluid to thermal communication with a thermal load.

The method of the preceding clause, wherein passing the flow of compressed fluid through the anti-ice system comprises passing the flow of compressed fluid through a wing anti-ice system.

The method of any preceding clause, wherein the turbine comprises a first turbine, and wherein the flow of compressed fluid includes a pressure parameter, and further comprising flowing the flow of compressed fluid through a second turbine to reduce the pressure parameter before passing the flow of compressed fluid through the anti-ice system.

The method of any preceding clause, further comprising selectively flowing the flow of compressed fluid to the second turbine based on a flow control device downstream of the compressor section.

The method of any preceding clause, wherein the turbine is operably coupled to a driveshaft, and further comprising generating an output torque at the driveshaft to operate a load device.

The method of any preceding clause, further comprising selectively passing at least a portion of the flow of compressed fluid to an ejector.

The method of any preceding clause, further comprising: flowing the flow of compressed fluid to a flow control device located upstream of the anti-ice system; selectively flowing a first portion of the flow of compressed fluid to an ejector via the flow control device; and selectively flowing a second portion of the flow of compressed fluid to the anti-ice system via the flow control device.

The method of any preceding clause, further comprising: flowing the flow of compressed fluid to a flow control device located upstream of the anti-ice system; selectively flowing a first portion of the flow of compressed fluid to an ejector via the flow control device; entraining an ingested flow of fluid via a discharge flow of fluid from the ejector; selectively flowing a second portion of the flow of compressed fluid to the anti-ice system via the flow control device; collecting the second portion of the flow of compressed fluid from the anti-ice system; collecting the collected second portion of the flow of compressed fluid, the ingested flow of fluid, and the discharge flow of fluid to form a mixed flow of fluids; and flowing the mixed flow of fluids to the turbine.

The method of any preceding clause, further comprising: flowing the flow of compressed fluid to a flow control device located upstream of the anti-ice system; selectively flowing a first portion of the flow of compressed fluid to an ejector via the flow control device; entraining an ingested flow of fluid based on a discharge flow of fluid from the ejector; and selectively flowing a second portion of the flow of compressed fluid to the anti-ice system via the flow control device.

A propulsion system, comprising: a turbomachine comprising a compressor section, a combustion section, and a turbine section in serial flow order; a thermal management system defining a thermal management system flowpath and operable to receive a flow of bleed air extracted from the compressor section through the thermal management system flowpath, the thermal management system comprising: an anti-ice system thermally connected to the thermal management system flowpath and to the compressor section; an expansion turbine fluidly connected to the thermal management system flowpath downstream of the anti-ice system; and a thermal load thermally connected to the thermal management system flowpath downstream of the expansion turbine.

The propulsion system of any preceding clause, wherein the expansion turbine comprises a first expansion turbine, and wherein the thermal management system further comprises a second expansion turbine fluidly connected to the thermal management system flowpath upstream of the anti-ice system.

The propulsion system of any preceding clause, wherein the thermal management system further comprises a flow control device connected to the thermal management system flowpath and operable to selectively flow the flow of bleed air to at least one of the anti-ice system or the second expansion turbine.

The propulsion system of any preceding clause, wherein the thermal management system further comprises an ejector connected to the thermal management system flowpath and located downstream of the compressor section.

The propulsion system of any preceding clause, wherein the thermal management system further comprises a flow control device connected to the thermal management system flowpath and operable to selectively flow the flow of bleed air to at least one of the anti-ice system or the ejector.

The propulsion system of any preceding clause, further comprising a load device, and wherein the expansion turbine is operably coupled to a driveshaft to operate the load device.

The propulsion system of any preceding clause, wherein the thermal management system further comprises an ejector connected to the thermal management system flowpath and operable to entrain an ingested flow of fluid based on a discharge flow of the flow of bleed air from the ejector.

The propulsion system of any preceding clause, wherein the ingested flow of fluid is fluidly connected to the thermal management system flowpath.

An aircraft, comprising: a fuselage; a pair of wings coupled to the fuselage; a propulsion system coupled to at least one of the fuselage or the pair of wings, the propulsion system comprising a turbomachine having a compressor section, a combustion section, and a turbine section in serial flow order; and a thermal management system defining a thermal management system flowpath and operable to receive a flow of bleed air extracted from the compressor section through the thermal management system flowpath, the thermal management system comprising: an anti-ice system thermally connected to the thermal management system flowpath and operable to prevent ice formation on at least one of the pair of wings using the flow of bleed air; and an expansion turbine fluidly connected to the thermal management system flowpath at a location downstream of the anti-ice system and operable to expand the flow of bleed air received from the anti-ice system.

The aircraft of any preceding clause, wherein the expansion turbine comprises a first expansion turbine, and wherein the thermal management system further comprises a second expansion turbine fluidly connected to the thermal management system flowpath upstream of the anti-ice system.

The aircraft of any preceding clause, wherein the thermal management system further comprises a flow control device located upstream of the second expansion turbine and the anti-ice system, the flow control device operable to selectively flow the flow of bleed air to at least one of the second expansion turbine or the anti-ice system.

The aircraft of any preceding clause, wherein the thermal management system further comprises an ejector connected to the thermal management system flowpath and located downstream of the compressor section.

The aircraft of any preceding clause, wherein the thermal management system further comprises a flow control device connected to the thermal management system flowpath and operable to selectively flow the flow of bleed air to at least one of the anti-ice system or the ejector.

The aircraft of any preceding clause, further comprising a load device, and wherein the expansion turbine is operably coupled to a driveshaft to operate the load device.

The aircraft of any preceding clause, wherein the thermal management system further comprises an ejector connected to the thermal management system flowpath and operable to entrain an ingested flow of fluid based on a discharge flow of the flow of bleed air from the ejector.

The aircraft of any preceding clause, wherein the ingested flow of fluid is fluidly connected to the thermal management system flowpath.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

I claim:

1. A method for thermal management for an aircraft, the method comprising:
   extracting a flow of compressed fluid from a compressor section of a propulsion system;
   passing the flow of compressed fluid through an anti-ice system;
   flowing the flow of compressed fluid from the anti-ice system to a turbine;
   expanding the flow of compressed fluid across the turbine; and
   flowing the expanded flow of compressed fluid to thermal communication with a thermal load.

2. The method of claim 1, wherein passing the flow of compressed fluid through the anti-ice system comprises passing the flow of compressed fluid through a wing anti-ice system.

3. The method of claim 1, wherein the turbine comprises a first turbine, and wherein the flow of compressed fluid includes a pressure parameter, and further comprising flowing the flow of compressed fluid through a second turbine to reduce the pressure parameter before passing the flow of compressed fluid through the anti-ice system.

4. The method of claim 3, further comprising selectively flowing the flow of compressed fluid to the second turbine based on a flow control device downstream of the compressor section.

5. The method of claim 1, wherein the turbine is operably coupled to a driveshaft, and further comprising generating an output torque at the driveshaft to operate a load device.

6. The method of claim 1, further comprising selectively passing at least a portion of the flow of compressed fluid to an ejector.

7. The method of claim 1, further comprising:
   flowing the flow of compressed fluid to a flow control device located upstream of the anti-ice system;
   selectively flowing a first portion of the flow of compressed fluid to an ejector via the flow control device; and
   selectively flowing a second portion of the flow of compressed fluid to the anti-ice system via the flow control device.

8. The method of claim 1, further comprising:
   flowing the flow of compressed fluid to a flow control device located upstream of the anti-ice system;
   selectively flowing a first portion of the flow of compressed fluid to an ejector via the flow control device;
   entraining an ingested flow of fluid via a discharge flow of fluid from the ejector;
   selectively flowing a second portion of the flow of compressed fluid to the anti-ice system via the flow control device;
   collecting the second portion of the flow of compressed fluid from the anti-ice system;
   collecting the collected second portion of the flow of compressed fluid, the ingested flow of fluid, and the discharge flow of fluid to form a mixed flow of fluids; and
   flowing the mixed flow of fluids to the turbine.

9. The method of claim 1, further comprising:
   flowing the flow of compressed fluid to a flow control device located upstream of the anti-ice system;
   selectively flowing a first portion of the flow of compressed fluid to an ejector via the flow control device;
   entraining an ingested flow of fluid based on a discharge flow of fluid from the ejector; and
   selectively flowing a second portion of the flow of compressed fluid to the anti-ice system via the flow control device.

10. A propulsion system comprising:
   a turbomachine comprising a compressor section, a combustion section, and a turbine section in serial flow order; and
   a thermal management system defining a thermal management system flowpath and operable to receive a flow of bleed air extracted from the compressor section through the thermal management system flowpath, the thermal management system comprising:

an anti-ice system thermally connected to the thermal management system flowpath and to the compressor section;

an expansion turbine fluidly connected to the thermal management system flowpath downstream of the anti-ice system; and a thermal load thermally connected to the thermal management system flowpath downstream of the expansion turbine.

11. The propulsion system of claim 10, wherein the expansion turbine comprises a first expansion turbine, and wherein the thermal management system further comprises a second expansion turbine fluidly connected to the thermal management system flowpath upstream of the anti-ice system.

12. The propulsion system of claim 11, wherein the thermal management system further comprises a flow control device connected to the thermal management system flowpath and operable to selectively flow the flow of bleed air to at least one of the anti-ice system or the second expansion turbine.

13. The propulsion system of claim 10, wherein the thermal management system further comprises an ejector connected to the thermal management system flowpath and located downstream of the compressor section.

14. The propulsion system of claim 13, wherein the thermal management system further comprises a flow control device connected to the thermal management system flowpath and operable to selectively flow the flow of bleed air to at least one of the anti-ice system or the ejector.

15. The propulsion system of claim 10, further comprising a load device, and wherein the expansion turbine is operably coupled to a driveshaft to operate the load device.

16. The propulsion system of claim 10, wherein the thermal management system further comprises an ejector connected to the thermal management system flowpath and operable to entrain an ingested flow of fluid based on a discharge flow of the flow of bleed air from the ejector.

17. The propulsion system of claim 16, wherein the ingested flow of fluid is fluidly connected to the thermal management system flowpath.

18. An aircraft, comprising:

a fuselage;

a pair of wings coupled to the fuselage;

a propulsion system coupled to at least one of the fuselage or the pair of wings, the propulsion system comprising a turbomachine having a compressor section, a combustion section, and a turbine section in serial flow order; and a thermal management system defining a thermal management system flowpath and operable to receive a flow of bleed air extracted from the compressor section through the thermal management system flowpath, the thermal management system comprising:

an anti-ice system thermally connected to the thermal management system flowpath and operable to prevent ice formation on at least one of the pair of wings using the flow of bleed air; and an expansion turbine fluidly connected to the thermal management system flowpath at a location downstream of the anti-ice system and operable to expand the flow of bleed air received from the anti-ice system.

19. The aircraft of claim 18, wherein the expansion turbine comprises a first expansion turbine, and wherein the thermal management system further comprises a second expansion turbine fluidly connected to the thermal management system flowpath upstream of the anti-ice system.

20. The aircraft of claim 19, wherein the thermal management system further comprises a flow control device located upstream of the second expansion turbine and the anti-ice system, the flow control device operable to selectively flow the flow of bleed air to at least one of the second expansion turbine or the anti-ice system.

* * * * *